United States Patent
Wu et al.

(10) Patent No.: US 8,937,872 B2
(45) Date of Patent: Jan. 20, 2015

(54) PEER-TO-PEER CONTROL NETWORK FOR A WIRELESS RADIO ACCESS NETWORK

(75) Inventors: Shiquan Wu, Nepean (CA); Jung Yee, Ottawa (CA)

(73) Assignee: Wi-LAN, Inc., Ottawa (CA)

(*) Notice: Subject to any disclaimer, the term of this patent is extended or adjusted under 35 U.S.C. 154(b) by 441 days.

(21) Appl. No.: 12/793,969

(22) Filed: Jun. 4, 2010

(65) Prior Publication Data

US 2010/0309806 A1 Dec. 9, 2010

Related U.S. Application Data

(60) Provisional application No. 61/185,097, filed on Jun. 8, 2009.

(51) Int. Cl.

| | | |
|---|---|---|
| G01R 31/08 | (2006.01) | |
| G06F 11/00 | (2006.01) | |
| H04J 1/16 | (2006.01) | |
| H04B 7/005 | (2006.01) | |
| H04L 12/28 | (2006.01) | |
| H04B 1/00 | (2006.01) | |
| H04B 7/00 | (2006.01) | |
| H04B 15/00 | (2006.01) | |
| H04W 16/14 | (2009.01) | |
| H04H 20/42 | (2008.01) | |

(52) U.S. Cl.
CPC ............ *H04W 16/14* (2013.01); *H04H 20/423* (2013.01)
USPC ........... 370/252; 370/278; 370/310; 370/351; 370/389; 455/63.1; 455/67.11; 455/509; 455/512

(58) Field of Classification Search
None
See application file for complete search history.

(56) References Cited

U.S. PATENT DOCUMENTS

| 4,750,036 A | 6/1988 | Martinez |
|---|---|---|
| 5,956,642 A | 9/1999 | Larsson et al. |
| 6,327,300 B1 | 12/2001 | Souissi et al. |
| 6,385,434 B1 | 5/2002 | Chuprun et al. |
| 6,389,088 B1 | 5/2002 | Blois et al. |
| 6,505,032 B1 | 1/2003 | McCorkle et al. |
| 6,700,939 B1 | 3/2004 | McCorkle et al. |

(Continued)

FOREIGN PATENT DOCUMENTS

| CA | 1981500 A | 6/2007 |
|---|---|---|
| CN | 1481509 A | 3/2004 |

(Continued)

OTHER PUBLICATIONS

Stevenson. "IEEE starts standard to tap open regions in the TV spectrum for wireless broadband services." Oct. 12, 2004. http://standards.ieee.org/announcements/pr_80222.html, 3 pages.

(Continued)

*Primary Examiner* — Hassan Phillips
*Assistant Examiner* — Lonnie Sweet
(74) *Attorney, Agent, or Firm* — Procopio, Cory, Hargreaves & Savitch LLP

(57) ABSTRACT

A spectrum manager and base station controller for a wireless radio access network allocates TV band white space to all TV band devices under its control using: an allocation policy; information pulled/pushed from a white space database, spectrum usage data supplied by a spectrum sensing engine, and information received from at least one other peer spectrum manager and base station controller for the wireless radio access network.

20 Claims, 5 Drawing Sheets

(56) References Cited

U.S. PATENT DOCUMENTS

| | | |
|---|---|---|
| 6,735,238 B1 | 5/2004 | McCorkle |
| 6,859,506 B1 | 2/2005 | McCorkle |
| 6,901,112 B2 | 5/2005 | McCorkle et al. |
| 6,909,877 B2 | 6/2005 | Rofheart et al. |
| 6,912,372 B2 | 6/2005 | McCorkle et al. |
| 6,931,078 B2 | 8/2005 | McCorkle et al. |
| 7,079,604 B1 | 7/2006 | Miller et al. |
| 7,177,341 B2 | 2/2007 | McCorkle |
| 7,292,622 B2 | 11/2007 | McCorkle |
| 7,627,056 B1 | 12/2009 | Harris et al. |
| 7,668,262 B2 | 2/2010 | Woo et al. |
| 7,689,186 B2 | 3/2010 | Matoba et al. |
| 7,710,919 B2 | 5/2010 | Woo et al. |
| 7,852,868 B2 | 12/2010 | Gardner et al. |
| 7,865,170 B2 | 1/2011 | Altizer et al. |
| 7,876,869 B1 | 1/2011 | Gupta |
| 7,969,311 B2 | 6/2011 | Markhovsky et al. |
| 8,081,997 B2 | 12/2011 | Sambhwani et al. |
| 8,150,328 B2 * | 4/2012 | Chaudhri et al. .......... 455/67.11 |
| 8,305,917 B2 * | 11/2012 | Ahuja et al. ................ 370/252 |
| 2001/0032225 A1 | 10/2001 | Tal et al. |
| 2002/0086707 A1 | 7/2002 | Struhsaker et al. |
| 2003/0021295 A1 | 1/2003 | Sahinoglu et al. |
| 2003/0096631 A1 | 5/2003 | Kayama et al. |
| 2004/0052228 A1 | 3/2004 | Tellado et al. |
| 2004/0085892 A1 | 5/2004 | Walton et al. |
| 2005/0152478 A1 | 7/2005 | Jalloul et al. |
| 2005/0156775 A1 | 7/2005 | Petre et al. |
| 2005/0254442 A1 | 11/2005 | Proctor, Jr. et al. |
| 2005/0286788 A1 | 12/2005 | Orr |
| 2006/0008016 A1 | 1/2006 | Balakrishnan et al. |
| 2006/0067354 A1 | 3/2006 | Waltho et al. |
| 2006/0083205 A1 | 4/2006 | Buddhikot et al. |
| 2006/0128428 A1 | 6/2006 | Rooyen |
| 2006/0203794 A1 | 9/2006 | Sampath et al. |
| 2006/0215606 A1 | 9/2006 | Yeon et al. |
| 2007/0087700 A1 | 4/2007 | Tanida |
| 2007/0091998 A1 | 4/2007 | Woo et al. |
| 2007/0100922 A1 | 5/2007 | Ashish |
| 2007/0115878 A1 | 5/2007 | Ashish et al. |
| 2007/0117537 A1 | 5/2007 | Hui et al. |
| 2007/0133387 A1 | 6/2007 | Arslan et al. |
| 2007/0183591 A1 | 8/2007 | Geile et al. |
| 2007/0200727 A1 | 8/2007 | Sakamoto |
| 2007/0202867 A1 | 8/2007 | Waltho et al. |
| 2007/0223582 A1 | 9/2007 | Borer |
| 2007/0249341 A1 | 10/2007 | Chu et al. |
| 2007/0253394 A1 | 11/2007 | Horiguchi et al. |
| 2008/0004839 A1 | 1/2008 | Papadimitriou et al. |
| 2008/0010208 A1 | 1/2008 | Callaway |
| 2008/0075191 A1 | 3/2008 | Haartsen |
| 2008/0080604 A1 | 4/2008 | Hur et al. |
| 2008/0086286 A1 | 4/2008 | Shellhammer |
| 2008/0086749 A1 | 4/2008 | Goldberg et al. |
| 2008/0089281 A1 | 4/2008 | Yoon et al. |
| 2008/0089306 A1 | 4/2008 | Hu |
| 2008/0102822 A1 | 5/2008 | Feng et al. |
| 2008/0108366 A1 | 5/2008 | Hu |
| 2008/0112427 A1 | 5/2008 | Seidel et al. |
| 2008/0112467 A1 * | 5/2008 | Shellhammer ................ 375/143 |
| 2008/0130519 A1 | 6/2008 | Bahl et al. |
| 2008/0165680 A1 | 7/2008 | Chang |
| 2008/0165754 A1 | 7/2008 | Hu |
| 2008/0166974 A1 | 7/2008 | Teo et al. |
| 2008/0192686 A1 | 8/2008 | Cho et al. |
| 2008/0207136 A1 | 8/2008 | Tang et al. |
| 2008/0207204 A1 | 8/2008 | Vlantis et al. |
| 2008/0212725 A1 | 9/2008 | Tang |
| 2008/0259859 A1 | 10/2008 | Cordeiro |
| 2008/0261639 A1 | 10/2008 | Sun et al. |
| 2008/0268832 A1 | 10/2008 | Peng |
| 2008/0268892 A1 | 10/2008 | Hamdi et al. |
| 2008/0293353 A1 | 11/2008 | Mody et al. |
| 2008/0293410 A1 | 11/2008 | Chan et al. |
| 2008/0299918 A1 | 12/2008 | Jallon |
| 2008/0305750 A1 | 12/2008 | Alon et al. |
| 2009/0060001 A1 | 3/2009 | Waltho |
| 2009/0061779 A1 * | 3/2009 | Gurney et al. ............... 455/63.1 |
| 2009/0061887 A1 | 3/2009 | Hart et al. |
| 2009/0067354 A1 | 3/2009 | Gao |
| 2009/0080389 A1 * | 3/2009 | Messerges et al. ........... 370/338 |
| 2009/0086618 A1 | 4/2009 | Muschallik et al. |
| 2009/0124208 A1 | 5/2009 | Mody |
| 2009/0144791 A1 | 6/2009 | Huffman et al. |
| 2009/0196180 A1 | 8/2009 | Bahl et al. |
| 2009/0197627 A1 * | 8/2009 | Kuffner et al. ............... 455/522 |
| 2009/0235316 A1 | 9/2009 | Wu et al. |
| 2009/0247201 A1 * | 10/2009 | Ye et al. ....................... 455/509 |
| 2009/0296751 A1 | 12/2009 | Kewitsch et al. |
| 2009/0323835 A1 * | 12/2009 | Rao et al. ..................... 375/260 |
| 2010/0045876 A1 * | 2/2010 | Gao et al. ..................... 348/731 |
| 2010/0069013 A1 | 3/2010 | Chaudhri et al. |
| 2010/0075611 A1 | 3/2010 | Budampati et al. |
| 2010/0075704 A1 | 3/2010 | McHenry |
| 2010/0091919 A1 | 4/2010 | Xu et al. |
| 2010/0124254 A1 | 5/2010 | Wu et al. |
| 2010/0137014 A1 * | 6/2010 | Rao et al. ..................... 455/512 |
| 2010/0166053 A1 | 7/2010 | Fukuhara et al. |
| 2010/0309317 A1 | 12/2010 | Wu et al. |
| 2010/0311341 A1 | 12/2010 | Gaddam et al. |
| 2011/0002309 A1 | 1/2011 | Park et al. |
| 2011/0043710 A1 | 2/2011 | Samarasooriya et al. |
| 2011/0150105 A1 | 6/2011 | Koga et al. |

FOREIGN PATENT DOCUMENTS

| | | |
|---|---|---|
| CN | 1677970 A | 10/2005 |
| CN | 1777167 A | 5/2006 |
| CN | 1791170 A | 6/2006 |
| CN | 1842178 A | 10/2006 |
| CN | 1878011 A | 12/2006 |
| CN | 1941762 A | 4/2007 |
| CN | 1981506 A | 6/2007 |
| CN | 101262702 A | 9/2008 |
| CN | 101292486 A | 10/2008 |
| EP | 1750466 | 2/2007 |
| EP | 1845636 A1 | 10/2007 |
| JP | 11-275165 | 10/1999 |
| JP | 2000-175110 A | 6/2000 |
| JP | 2002-529018 A | 9/2002 |
| JP | 2005-057644 | 3/2005 |
| JP | 2005-522061 | 7/2005 |
| JP | 2007-036490 | 2/2007 |
| JP | 2007-036491 | 2/2007 |
| JP | 2007-081860 A | 3/2007 |
| JP | 2007-166068 | 6/2007 |
| JP | 2007-166488 A | 6/2007 |
| JP | 2007-300419 A | 11/2007 |
| JP | 2008-533913 A | 8/2008 |
| JP | 2008-259106 A | 10/2008 |
| WO | 2002023758 A1 | 3/2002 |
| WO | 2006/046424 A1 | 5/2006 |
| WO | 2007043827 A1 | 4/2007 |
| WO | 2007049760 A1 | 5/2007 |
| WO | 2007053196 A1 | 5/2007 |
| WO | 2007056020 A1 | 5/2007 |
| WO | 2007056081 A1 | 5/2007 |
| WO | 2007060493 A2 | 5/2007 |
| WO | 2007081503 A1 | 7/2007 |
| WO | 2007094604 A1 | 8/2007 |
| WO | 2007096819 A2 | 8/2007 |
| WO | 2007100323 A1 | 9/2007 |
| WO | 2007122297 A1 | 11/2007 |
| WO | 2008013429 A2 | 1/2008 |
| WO | 2008014293 A1 | 1/2008 |
| WO | 2008032999 A2 | 3/2008 |
| WO | 2008038207 A2 | 4/2008 |
| WO | 2008060203 A1 | 5/2008 |
| WO | 2008086243 A1 | 7/2008 |
| WO | 2008090509 A2 | 7/2008 |
| WO | 2008096921 A1 | 8/2008 |
| WO | 2008097253 A1 | 8/2008 |
| WO | 2008107854 A1 | 9/2008 |
| WO | 2008109641 A2 | 9/2008 |

(56) References Cited

FOREIGN PATENT DOCUMENTS

| WO | 2008114216 A2 | 9/2008 |
|---|---|---|
| WO | 2008140417 A1 | 11/2008 |
| WO | 2008144323 | 11/2008 |
| WO | 2009/018300 A1 | 2/2009 |
| WO | 2009114931 A1 | 9/2009 |

OTHER PUBLICATIONS

International Search Report and Written Opinion as issued in International Patent Application No. PCT/CA2010/000126 on May 5, 2010, 8 pages.

International Search Report and Written Opinion as issued in International Patent Application No. PCT/CA2010/000823 on Oct. 26, 2010, 11 pages.

Rhodes, C., Where are the White Spaces in the TV Broadcast Spectrum? May 17, 2008 at National Translator Association pp. 1-19.

International Search Report and Written Opinion for PCT/CA2009/000371, issued May 29, 2009, 9 pages.

International Search Report and Written Opinion from PCT/CA2009/001664 dated Feb. 1, 2010, 8 pages.

International Search Report and Written Opinion issued Dec. 17, 2009 in PCT/CA2009/001392, 6 pages.

Jones et al. "Initial Evaluation of the Performance of Prototype TV-Band White Space Devices." OET Report, FCC/OET 07-TR-1006, Tech. Rsch Br. Lab. Div. Office.,Jul. 31, 2007 in 85 pages.

Liang, et al. "Cognitive Radio on TV Bands: A New Approach to Provide Wireless Connectivity for Rural Areas." Wireless Technologies Advances for Emergency and Rural Communications. 2008 IEEE Wireless Communications, Jun. 2008, pp. 16-22.

Marcus et al. "Report of the Unlicensed Devices and Experimental Licenses Working Group", Federal Communications Commission Spectrum Policy Task Force. Nov. 15, 2002. Internet Wayback Machine capture http://replay.waybackmachine.org/20041119020032/http://www.fcc.gov/sptf/files/E&UWGFinalReport.doc, Nov. 19, 2004, 24 pages.

Motorola et al., IEEE 802.22-06/0005r5, PHY Overview, Mar. 2006, 21 pages.

Naveen, M.B., et al. WiMAX, pp. 1-20, http://ece-www.colorado.edu/~Liue/teaching/comm_standards/WiMax/WiMax_802_16e . . . , Jul. 14, 2008.

International Search Report and Written Opinion as issued in International Patent Application No. PCT/CA2010/000856 on Sep. 14, 2010, 9 pages.

Iancu, D., et al. "Analog Television, WiMax and DVB-H on the Same SoC Platform." Proceedings of the International Symposium on System-on-Chip, Tampere, Finland. Nov. 2006.

Narlanka, S. et al. "A Hardware Platform for Utilizing TV Bands with a Wi-Fi Radio." 15th IEEE Workshop on Local & Metropolitan Networks, Jun. 10-13, 2007, pp. 49-53.

Extended European Search Report for related EP Patent Application No. 10785619.7 dated May 17, 2013 in 12 pages.

Wu et al. "Spectrum Manager White Paper: 22-09/0113-00/0000-spectrum-manager-white-paper." IEEE Draft. Piscataway, NJ, US. vol. 802.22. Jun. 19, 2009, pp. 1-13. XP017656573, retrieved on Jun. 19, 2009.

Ecclesine. "IEEE 802 Ofcom Comments: 18-09/0054-06/0000-ieee-802-ofcom-comments." IEEE Draft. Piscataway, NJ, US. vol. 802.18, No. 6. May 1, 2009, pp. 1-11. XP017662465, retrieved on May 1, 2009.

Office Action and English translation for related JP Patent Application No. 2011-503315, dated Apr. 16, 2013, in 4 pages.

Office Action and Search Report (with translation) for related CN Patent Application No. 200980142699.2, dated Jun. 3, 2013, in 11 pages.

Kim et al. "A CR Platform for Applications in TV Whitespace Spectrum." Cognitive Radio Oriented Wireless Networks and Communications. IEEE 3rd International Conference, Piscataway, NJ. 2008. pp. 1-8.

Depardo et al. "Quantifying the Impact of Unlicensed Devices on Digital TV Receivers." Retrieved from http://www.newamerica.net/files/NAF%20Spectrum%20Technical%20Report%20_FINALSUBMITTED_0.pdf. Accessed on Apr. 24, 2013. pp. 1-29, Jan. 31, 2007.

Office Action and Search Report for related CN Patent Application No. 200980134967.6 dated May 6, 2013 in 9 pages.

Extended European Search Report for related EP Patent Application No. EP 09817150.7 dated May 14, 2013 in 7 pages.

Extended European Search Report for EP 10735465.6, dated Nov. 8, 2012, in 7 pages.

Office Action and Search Report (with translation) for related CN Patent Application No. 201080003588.6, dated Jul. 1, 2013, in 7 pages.

Oh et al. "White-Space Sensing Device for Detecting Vacant Channels in TV Bands." Proc. CROWNCOM, Singapore, May 2008.

Office Action and Search Report (with English translation) for related TW Patent Application No. 099116618, dated Aug. 15, 2013, in 8 pages.

Office Action with English Translation for related JP Patent Application No. 2011-535848, dated Oct. 22, 2013, in 4 pages.

Office Action with English Translation for related JP Patent Application No. 2012-182907, dated Oct. 22, 2013, in 6 pages.

IEEE Standard 802.16. "Part 16: Air Interface for Fixed Broadband Wireless Access Systems." IEEE Standard for Local and Metropolitan Area Networks, Oct. 1, 2004.

Akyildiz et al. "NeXt generation/dynamic spectrum access/cognitive radio wireless networks: A survey." Computer Networks. 50(13):2127-2159, Sep. 15, 2006.

Extended European Search Report for EP Patent Application No. 09827082.0, mailed on Dec. 12, 2013, in 12 pages.

IEEE 802.22 Working Group of the LAN/MAN Standards Comittee. "IEEE P802.22 ™/DRAFTv1.0: Draft Standard for Wireless Regional Area Networks Part 22: Cognitive Wireless RAN Medium Access Control (MAC) and Physical Layer (PHY) specifications: Policies and procedures for operation in the TV Brands." Apr. 8, 2008, 426 pages.

Office Action and translation for related JP Patent Application No. 2012-513425, dated Feb. 10, 2014 in 4 pages.

Office Action for related CN Patent Application No. 2010800226756 dated Dec. 30, 2013 in 8 pages.

* cited by examiner

PEER-TO-PEER CONTROL NETWORK FOR A WIRELESS RADIO ACCESS NETWORK

RELATED APPLICATIONS

This application claims the benefit of priority to U.S. patent application 61/185,097 filed Jun. 8, 2009.

FIELD OF THE INVENTION

This invention relates in general to use of vacant TV band channels and, in particular, to a peer-to-peer control network for a wireless radio access network that operates in vacant TV band channels.

BACKGROUND OF THE INVENTION

Vacant TV band channels, also known as "TV white space", are ideally suited for unlicensed wireless communications services. Access to vacant TV band channels facilitates a market for low-cost, high-capacity, mobile wireless broadband networks, including emerging in-building networks. Using TV white space, the wireless broadband industry can deliver wireless communications services to households and handholds at an inexpensive rate. However, as the TV band spectrum "belongs" to TV broadcasters, any secondary usage must necessarily be conditional. Therefore, the United States Federal Communications Commission (FCC) engineering office released a Report and Order (FCC R&O) on Nov. 14, 2008, that spelled out the conditions which TV band devices must satisfy in order to use the TV white space. Currently under consideration is construction of a database for assisting the TV band devices in locating TV white space that can be used for secondary wireless services. The main requirement is not to interfere with the primary wireless services active in any given geographical area. Thus, the signals broadcast by any TV band device operating in the TV white space must follow the FCC R&O so that the quality of the primary wireless services, such as digital television (DTV) broadcasts, wireless microphone systems, or other emerging licensed services already deployed, or to be deployed, will not be degraded by signals transmitted by the TV band devices. The term "white space etiquette" is used for the regulations that must be taken into account when designing and using devices adapted to operate in the TV white space. For conformity with these requirements, FCC R&O specifies several requirements, of which the 4 most relevant are summarized below.

Capability: For compliance with this requirement, FCC mandates that both fixed and mobile white space devices include geo-location and sensing capabilities and use a database, referred to herein as the "white space (WS) database", which provides information regarding the primary services active in each TV market. The WS database includes TV channel allocation and location of principal venues, such as stadiums, electronic news groups (ENGs), theatres, churches, etc. that operate wireless microphone systems. The database access and sensing capabilities should enable TV band devices to share TV white space with other secondary services without interfering with primary services. Personal/Portable TV band devices must either be under the control of a fixed TV band device, or must employ geo-location and/ or database access and spectrum sensing capabilities. When a protected signal is detected in a TV channel being used by a TV band device, the TV band device must cease operation in that TV channel within 2 seconds.

Power Radiation: FCC R&O specifies a maximum transmission power for fixed TV band devices of up to 1 watt with an antenna gain of 4 watts equivalent isotropic radiated power (EIRP). Personal/portable TV band devices are permitted to radiate up to 100 milliwatts EIRP with no antenna gain. When operating on a TV channel adjacent to a protected TV channel, the power radiation shall be limited to 40 milliwatts EIRP.

TV channel Assignment: Fixed and portable TV band devices can operate on any vacant TV band channel, from TV channel 21 to TV channel 51, excluding TV channel 37 which is reserved for telemetry. Communication between two fixed TV band devices is also allowed on TV channel 2 and TV channels 5 to 20, except those used by the private land-mobile radio services for public safety.

Adjacent TV channel Limitation: Fixed TV band devices are not allowed to operate on TV channels immediately adjacent to an ATSC protected TV channel. Portable TV band devices are allowed to operate on a TV channel immediately adjacent to a protected TV channel, but their out-of-band emission on the side of the adjacent TV channel should be limited to 55 dB below the power level at which they operate.

The wireless industry is contemplating using the TV band white space by developing standards for technology convergence into an architecture that is comfortable, easy to use and attractively priced. For example, the IEEE 802.22 Working Group, formed in 2004, received a mandate to develop a standard for Wireless Regional Area Networks (WRAN). The goal of this standard is to provide rural area broadband services to single-family residential, multi-dwelling units, small office/home office, small businesses, etc. The standard will be used by license-exempt devices that operate in the TV white space and conform to the FCC R&O. The draft of the 802.22 standard specifies that the network should operate in a point to multipoint configuration, where a base transceiver station (BTS) or an access point (AP) controls the medium access for all customer premise equipment it serves, while avoiding interference with broadcast services present in the operating area. One key feature of the WRAN BTS/AP is the capability to perform distributed spectrum sensing, where the customer premises equipment senses the spectrum and sends periodic reports to the serving BTS/AP informing it about what has been sensed. Based on the information gathered, the BTS/AP determines whether the current operating channel must be changed.

Conceptually, a TV band device should be capable of sensing its environment and location and altering its power, frequency, modulation and other parameters to dynamically use TV white space. TV band devices should allow spectrum sharing on a negotiated or opportunistic basis, adapt spectrum use to the real-time conditions of the operating environment, offer the potential for more flexible, efficient and comprehensive use of available spectrum, and reduce the risk of harmful interference. In general, a TV band wireless system may have 4 major components, i.e. a Sensing and Database Engine (SDE), a Physical Layer Processor (PHY), a MAC processor and a Spectrum manager $50a$(SM).

Spectrum sensing and WS database engine (SDE) operates to detect incumbent signals generated by primary services such as TV signals and wireless microphone systems. Significant effort has been invested in drafting the 802.22 Standard, including contributions on both ATSC signal sensing and wireless microphone sensing. Several key algorithms were developed and tested, based on various characteristics of the signals, such as signal energy detection, correlation, cyclostationary feature extraction, eigenvalue decomposition, fine FFT etc.

For ATSC signal sensing, detection is based on the ATSC signal format, which includes known embedded bit sequences, namely the ATSC pilot and pseudo-noise (PN) sequences. As such, various solutions are being proposed by 802.22 contributors. However, the hardware implementation of a sensor/detector still presents significant challenges due to lack of affordable, low-cost front-end components. Today, most proposed designs involve modifying the current TV tuner design to enable it to handle a required −114 dBm sensitivity. However, current consensus on ATSC signal sensing is that the FCC Rules and Orders may not meet broadcasters' real requirements. Namely, the broadcasters provide contours of the TV channels they operate, while the FCC Rules and Orders require that TV band devices use sensing to ensure that they do not interfere with TV channels operating in their area. However, it is quite possible that a TV band device will fail to sense a TV signal even if it is located within the contour of a TV channel licensed in that area. This could occur if the TV station is not broadcasting on that TV channel at the time. Broadcasters do not permit others to use their spectrum, even when it is not in use. Alternatively, if the sensing engine is located inside a building where a TV signal is not detectable (e.g. in the basement of a building) the broadcast may not be detected by the TV band device.

Sensing/detecting a wireless microphone signal is an even more complex operation. This is partly because there is no universal standard for wireless microphone systems. For example, wireless microphones may use UHF or VHF frequencies, frequency modulation (FM), amplitude modulation (AM), or various digital modulation schemes. More advanced models operate on a user selectable frequency to avoid interference, and permit the concurrent use of several microphones. For the wireless microphone systems that use frequency modulation, the FM waveform has an energy concentration about 40 kHz which may drift around within a 200 kHz bandwidth. However, the wireless microphone signals do not have any known sequence and the detection threshold based on the signal energy has been set very low (at −114 dBm). This makes the detection extremely challenging, and there are no proven solutions or viable proposals available yet. One solution proposed by the IEEE 802.22 Working Group in 802.22 TG-1 is to add a beacon mechanism to the wireless microphone signals, which should facilitate wireless microphone sensing. However, this solution is not ideal, since it is impractical to retrofit existing wireless microphones with a beacon mechanism.

The IEEE 802.22 Working Group also proposed use of WS database servers with WS databases for storing all meaningful system information and policy related radio parameters, to assist operation of TV band devices in a given area. The information stored in these WS databases would include the number of the protected TV channels, geo-location and TV channel contours of each TV tower and each stadium or other site using a wireless microphone system, and terrain elevation for the service region, maximum EIRP for the licensed TV channel, antenna height and gain, propagation models, interference scenarios. The information in the WS database will also include identification and geo-location information for the fixed TV WS (white space) devices in the service area, their transmission power and operating TV channels, etc. It is expected that the type and extent of information stored in the WS database will be agreed upon by broadcasters, regulators and service providers, and will be updated regularly. The WS database should be pulled by the TV band devices or pushed to the TV band devices. It is also expected that such WS database servers would be provided to serve each local network and that a regional WS database may also be available.

The term "system information" is used to designate the information stored in the WS database.

FIG. 1 illustrates relationships and interactions between entities that operate, use and maintain a WS database 10 using a WS database server 12, Broadcasters 14 and regulators 16 (or their authorized representatives) are the owners of the WS database server 12 and the WS database 10; users of the WS database 10 are TVWS service providers 18 and TV band device users 20. This system is organized in a client-server architecture where the WS database server 12 is the central registering unit, as well as the only provider of content and service. The remaining entities, TVWS service providers 18 and TV band devices 20 can only request content or the provision of services, without the possibility of sharing any of their own resources.

Broadcasters 14 and regulators 16 provide an identification of the available TV channels (i.e. by TV channel number) and an identification of the protected TV channels in their service area, with associated service contours. The owners 14, 16 must regularly update the WS database 10 with any new information available to them. They also perform any authorization, authentication and administration (AAA) functionality.

The TV WS service providers 18 and the TV band devices 20, which are the WS database 10 users, shall provide their configuration/transmission parameters to the WS database, together with any sensed data regarding the presence of a primary service they may have identified (sensed, detected) in that area. As users of the WS database, these entities 14, 16 must be validated (authentication and authorization) upon requesting WS database access. The information downloaded by these users is submitted to a validation and security verification process; the broadcasters 14 and/or regulators 16 shall confirm data before updating the WS database 10. TV band devices 20, particularly base transceiver stations (BTS) and access points (AP), shall access the WS database 10 to acquire protected TV channel information, available TV channel information, interference status, power limitation data, etc, which is used to configure spectrum usage, and convey that information to any TV band device 20 under their control . Each time an AP or BTS receives updates from the WS database 10, TV band devices 20 should reconfigure their spectrum information within 30 seconds, For example, when a broadcaster decides to use a TV channel, that TV channel must be vacated within a 30-second time frame.

Broadcasters 14 and regulators 16 may push updates to all TV band devices 20 in the service area either directly or via the TV WS service providers 18. Preferably, the TV WS service providers 18 provide an anchor point where the WS database server 12 can push data. Broadcasters 14 and regulators 16 may push/update a particular data type to clear a TV channel or multiple TV channels within a certain time. Many control networks and network entities and for managing TV white space spectrum usage by wireless radio access networks have been described. However, those control networks and network entities are based on a client-server architecture, which are expensive to implement, requires extensive maintenance, and is susceptible to single point of failure.

There therefore exists a need for a control network for a wireless radio access network that is robust and inexpensive to implement.

SUMMARY

Embodiments of the invention provide systems and methods for a peer-to-peer control network for a wireless radio access network (WRAN), in which peer spectrum managers serve as base station controllers to manage white space spectrum usage in the WRAN.

In one aspect a peer-to-peer control network for a wireless radio access network includes a peer TV band sensing engine that collects TV band spectrum occupancy information; a peer geolocation engine that collects geolocation information from the base stations and the TV band devices in the wireless radio access network; and a peer spectrum manager and base station controller having a communications link to a white space database server, and a processor that processes spectrum occupancy information received from the peer TV band sensing engine, the peer geolocation engine, and the white space database, and allocates white space spectrum to at least one base station and TV band devices associated with the at least one base station.

In another aspect a method of controlling TV band white space spectrum usage by base stations of a remote wireless access network includes provisioning the remote wireless access network with a peer-to-peer control network that comprises peer spectrum manager and base station controllers respectively having a communications link to a white space database server, and a processor that processes TV band spectrum occupancy information received from peer TV Band sensing engines, peer geolocation engines, and the white space database, and allocate the TV band white space spectrum to the base stations and TV band devices associated with the base stations based on the TV band spectrum occupancy information.

In a further aspect a spectrum manager and base station controller in a peer-to-peer control network for a TV band white space wireless radio access network have a TV band white space allocation policy; a communications link to a white space database server; and a processor that processes spectrum occupancy information received from a peer TV band sensing engine, a peer geolocation engine, and the white space database, and allocates white space spectrum to the base station and TV band devices associated with the base station.

These and other aspects and advantages of the invention may be further understand upon a review of the following description and the accompanying figures.

BRIEF DESCRIPTION OF THE DRAWINGS

The invention will now be described by way of example only and with reference to the following drawings, in which.

DETAILED DESCRIPTION

The invention provides a peer-to-peer control network for a wireless radio access network (WRAN), in which peer spectrum managers serve as base station controllers to manage white space spectrum usage in the WRAN. The peer-to-peer relationship between the spectrum managers depends on the type of network in which the peer-to-peer control network is deployed. In the case of 802.22 type networks, the peer-to-peer relationship is structured. For an 802.11 (WiFi) type network, the P2P relationship depends on the network topology. For an Extended Service Set (ESS) used by enterprises, it is structured. For both Basic Service Set (BSS) and Independent BSS topologies used in small office/home office (SOHO) or home environments, it is unstructured. After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention. The systems and methods disclosed herein can accelerate the learning of a novice and assist in the transition from a novice to expert level faster than conventional learning techniques.

Figure 2:
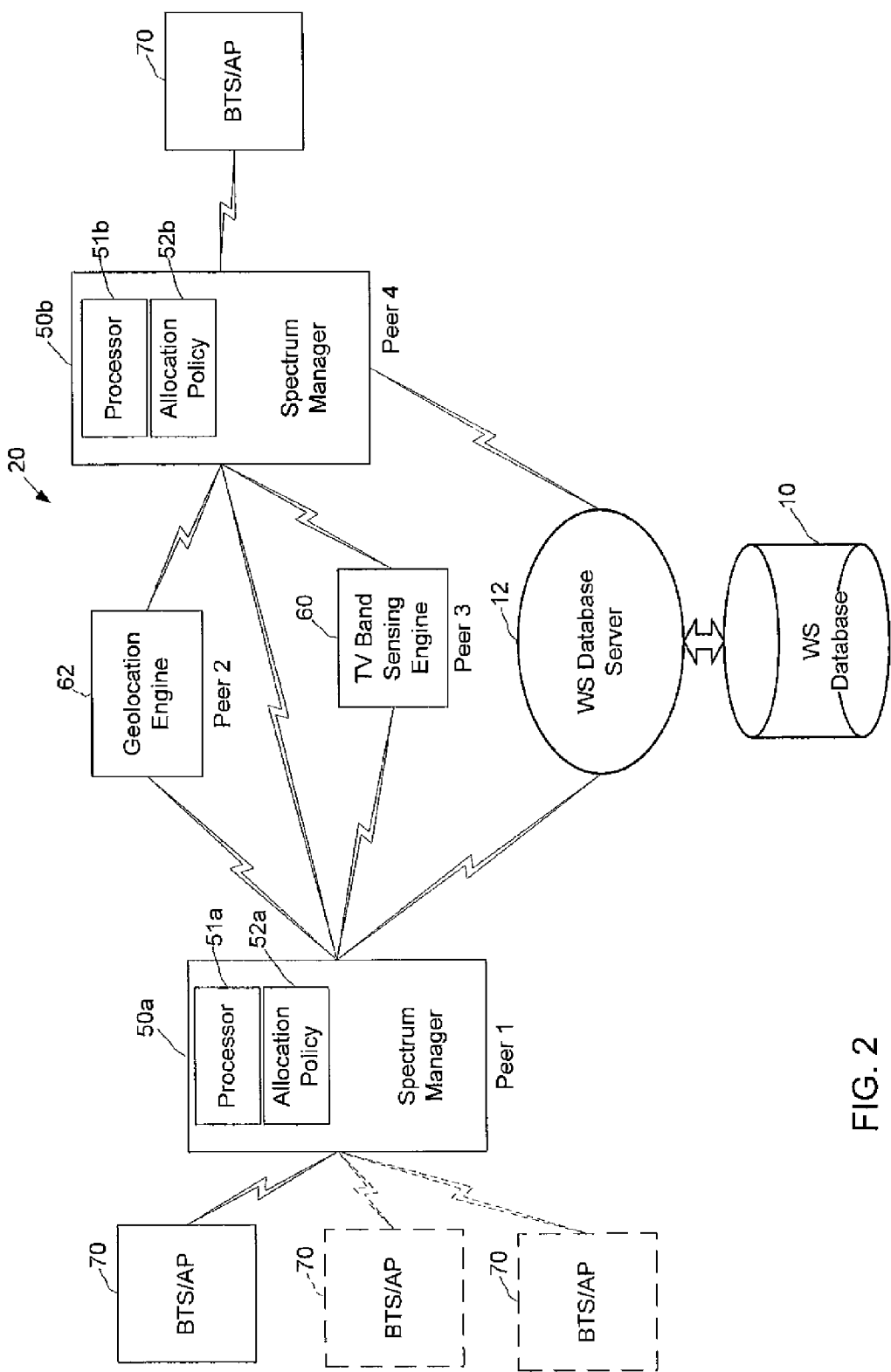
FIG. 2 is a block diagram schematically illustrating a peer-to-peer control network with spectrum managers in accordance with the invention.

FIG. 2 is a block diagram schematically illustrating a peer-to-peer control network 20 in accordance with the invention. The peer-to-peer control network 20 includes peer management and control entities, hereinafter referred to as spectrum managers. An instance of the spectrum managers, spectrum manager 50a, can reside on a BTS/AP, function as a standalone entity that serves two or more BTSs/APs and/or two or more TVWS service providers 16, or be distributed among two or more TVWS service provider servers, as will be explained in more detail below. The main function of the spectrum manager 50a is to control and manage access to, and use of, white space spectrum by all of the BTS(s)/AP(s) 70 and associated TV band devices 20 that it serves and controls. The spectrum manager 50a is a network node in the peer-to-peer control network 20, and can act as a client or a server, with or without centralized control, and with or without continuous connectivity. A processor 51a of the spectrum manager 50a executes programme instructions to perform functions that may be generally categorized as:

(a) Communication with Local or Regional WS databases 10: The spectrum manager 50a pulls, and/or is pushed, information from/by: a peer TV band sensing engine 60; a peer geolocation engine 62: a peer spectrum manager 50b: and/or, a WS database 10. The information pushed/pulled includes: TV channel information (availability and usage); information about TVWS service providers 18 and TV band devices 20, such as: geo-location, antenna gain, and performance metrics; interference scenarios (both self interference and interference among different TVWS service providers); carrier to interference ratios (C/I); signal-to-noise ratio (SNR) measurements; etc.

Figure 1:
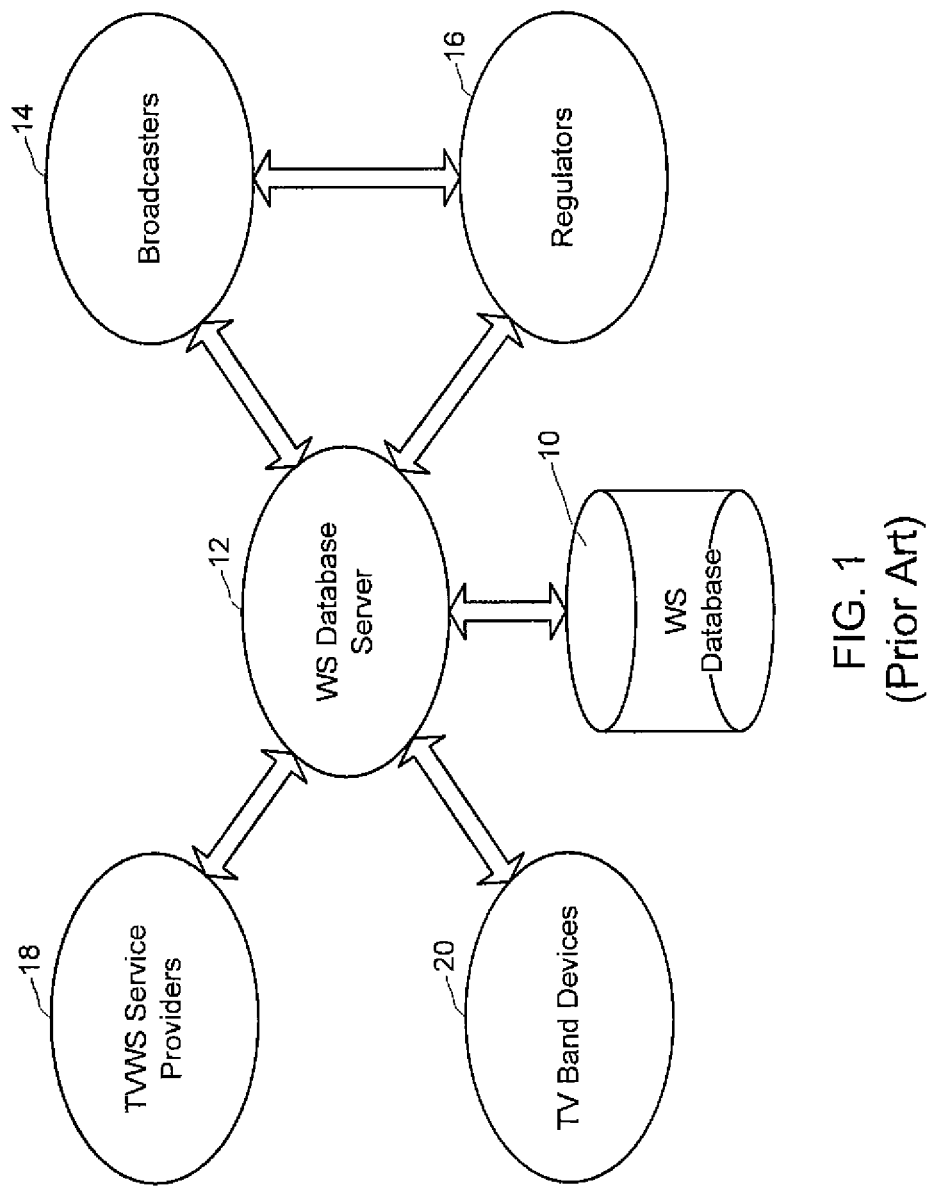
FIG. 1 illustrates relationships and interactions between prior art entities that operate, use and maintain a white space database using a white space database server.

(b) Spectrum Allocation: The spectrum manager 50a is responsible for allocating white space spectrum to the TV band devices 20 under its control. An allocation policy 52a adheres to the FCC R&O, and the spectrum manager 50a has the authority to shut down TV band devices 20 (FIG. 1) and to report to higher authorities any problematic TV band device 20 under its control. In general, the spectrum manager 50a operates to control white space spectrum allocation with built-in service fairness.

(c) Communication with the BTS/AP, the peer sensing engine 60, peer geolocation engine 62, peer spectrum manager 50*b*, and the WS database 10: The spectrum manager 50*a* has a direct communications link with each BTS/AP 70 under its control. The spectrum manager 50*a* also has a direct communications link with the sensing engine 60, geolocation engine 62, and spectrum manager 50*b*, as well as all other spectrum managers (not shown) in the peer-to-peer control network. Furthermore, the spectrum managers 50*a*, 50*b* have a client-server interface with the WS database server 12, therefore enabling the broadcasters 14 and the regulators 16 to indirectly manage TV band devices 20.

(d) White space spectrum usage optimization: The spectrum manager 50*a* performs allocation of white space spectrum, while attempting to optimize white space spectrum usage. To this end, the processor 51*a* of the spectrum manager 50*a* processes all information available from the local/regional WS database 10, as well as information collected from the TV band devices 20 it serves and makes spectrum allocation decisions based on the white space spectrum allocation policy 50*a* and the information collected from all other sources. The spectrum allocation decisions can be made for a single BTS/AP 70 or for a group of BTSs/APs 70 to optimize hardware efficiency, throughput, service latency, reliability, coverage and connectivity, coexistence with other wireless systems or networks, etc.

Figure 3:
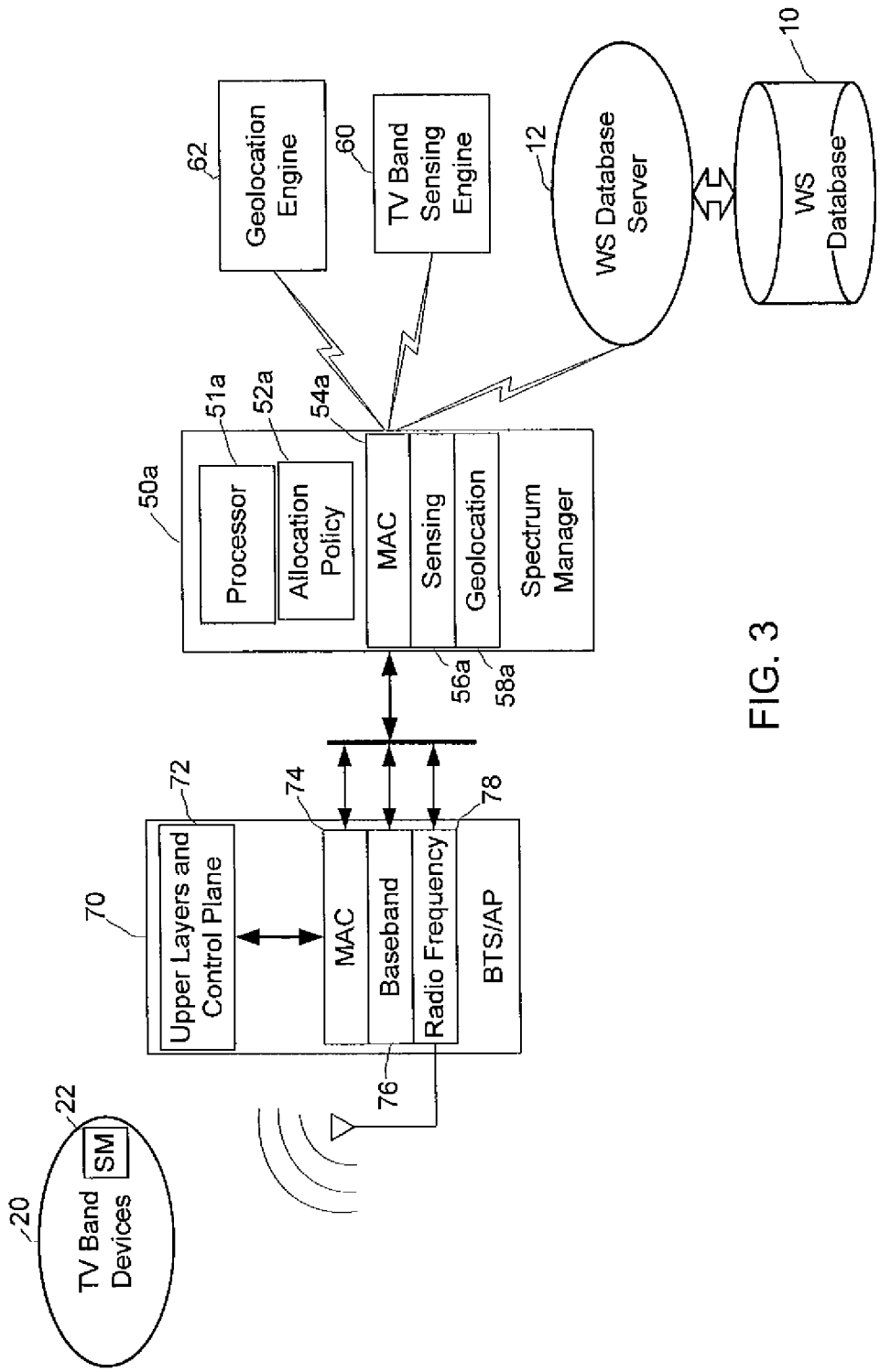
FIG. 3 is a block diagram schematically illustrating an embodiment of a spectrum manager shown in FIG. 2 that resides on a base transceiver station.

FIG. 3 is a block diagram of one embodiment of the spectrum manager 50*a*. In this embodiment, the spectrum manager 50*a* resides on, or is co-existent with, a BTS/AP 70. The processor 51*a* of the spectrum manager 50*a* interfaces with the PHY and MAC layer management entities 74, 76 and 78 of the BTS/AP 70, as well as with upper layers 72, such as internet protocol (IP) and asynchronous transfer mode (ATM), through an IEEE 802.1d compliant convergence sublayer (not shown). The spectrum manager 50*a* controls use of, and access to, white space spectrum for an entire cell served by the BTS/AP 70 and all associated TV band Devices 20 served by the BTS/AP 70. It is also possible to equip the TV band devices 20 with another instance, and optionally less complex version, of the spectrum manager (SM 22). The peer-to-peer architecture provides autonomous behavior necessary to ensure non-interfering operation of the TV band devices 20 in any situation.

There are three main functions at the PHY layer of the spectrum manager 50*a*: data communications (MAC layer 54*a*); TV band sensing functionality 56*a*; and, the geolocation functionality 58*a*. The TV band sensing functionality 56 and the geolocation functionality 58*a* respectively process and analyze information received from the TV band sensing engine 60 and the geolocation engine 62 to support cognitive abilities of the spectrum manager 50*a*. The MAC layer 54*a* provides mechanisms for flexible and efficient data communication, while providing reliable protection for incumbent services in the TV band and coexistence with other TV band devices 20 (i.e. enables multiple TV band devices 20 to operate in the same area by applying the white space spectrum allocation policy 52*a*, which is designed to address potential interference between those devices). When the spectrum manager 50*a* resides on or is co-existent with a BTS/AP, as shown in FIG. 4, it may optimize link level performance and maximize data throughput of a cell supported by the BTS/AP 70.

Figure 4:
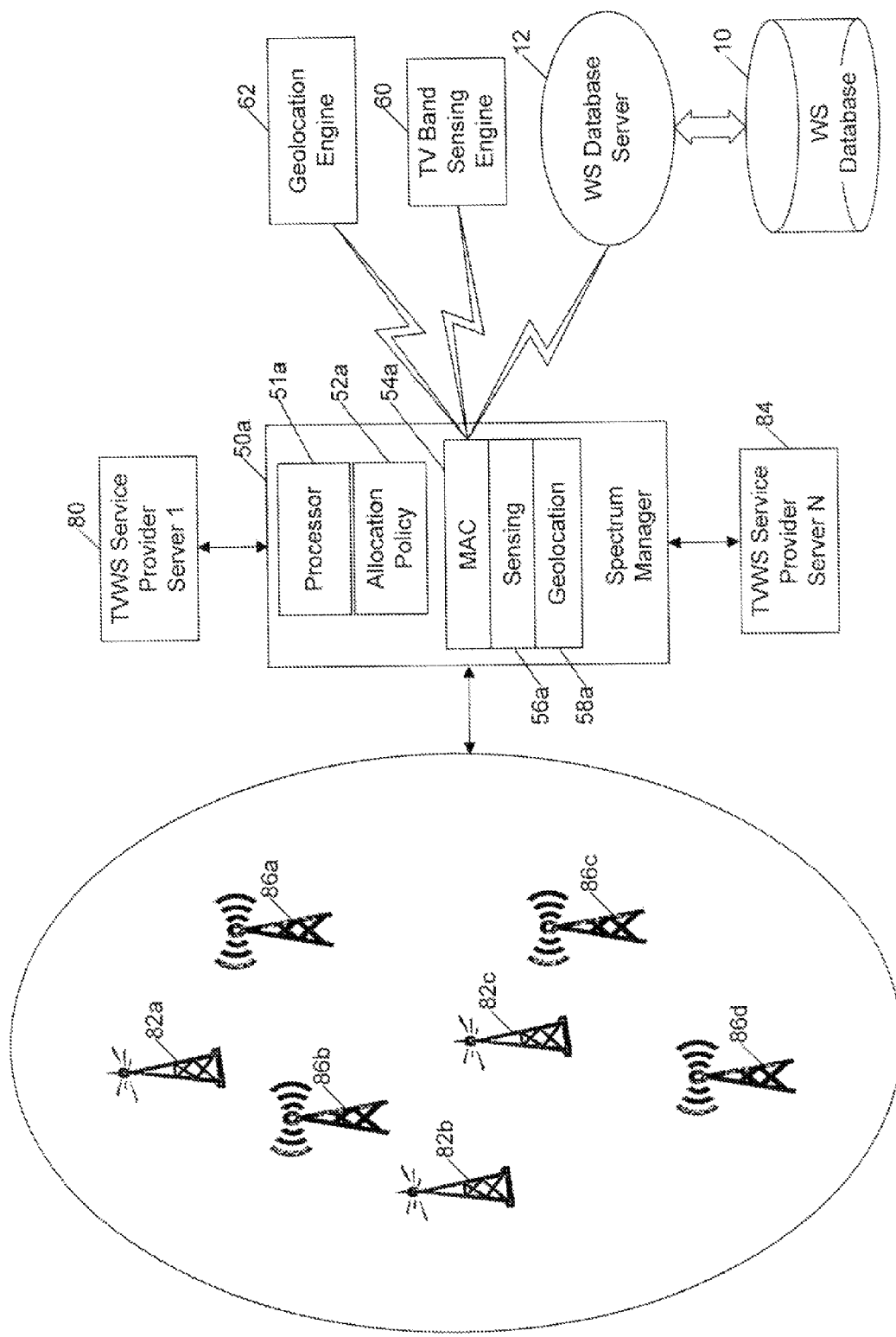
FIG. 4 schematically illustrates an embodiment of the spectrum manager that serves multiple base transceiver stations/access points.

As explained above, the spectrum manager 50*a* can also be co-located with a service provider server, or associated with two or more service provider servers, e.g. Server 1 and Server N, as show in FIG. 4. Alternatively, the functionality of the spectrum manager 50*a* can be distributed peer-to-peer between one or more BTS(s)/AP(s) and one or more TVWS service provider server(s).

FIG. 4 schematically illustrates an embodiment of the invention in which the spectrum manager 50*a* serves multiple BTSs/APs, including BTSs/APs belonging to TVWS service provider 80 (TVWS Service Provider Server 1) and TVWS service provider 84 (TVWS Service Provider Server N). In this embodiment, the spectrum manager 50*a* serves as a BTS/AP controller. TVWS service provider 80 provides service to TV band devices 20 (not shown) via BTS/AP 82*a*, 82*b* and 82*c*. TVWS service provider 84 provides service to other TV band devices 20 (not shown) via BTS/AP 86*a*, 86*b*, 86*c* and 86*d*. The spectrum manager 50*a* directly controls each BTS/AP 82*a*-82*c* and 86*a*-86*d*.

Different implementations of the spectrum manager 50*a* may require different system architectures and, therefore, require different performance metrics and business models. When a spectrum manager 50*a* is co-located with a service provider server 80, 84, the spectrum manager 50*a* can optimize the entire network using the white space allocation policy 52*a*, interference mitigation, radio resource coordination and management, power optimization and diversity data routing, etc.

Figure 5:
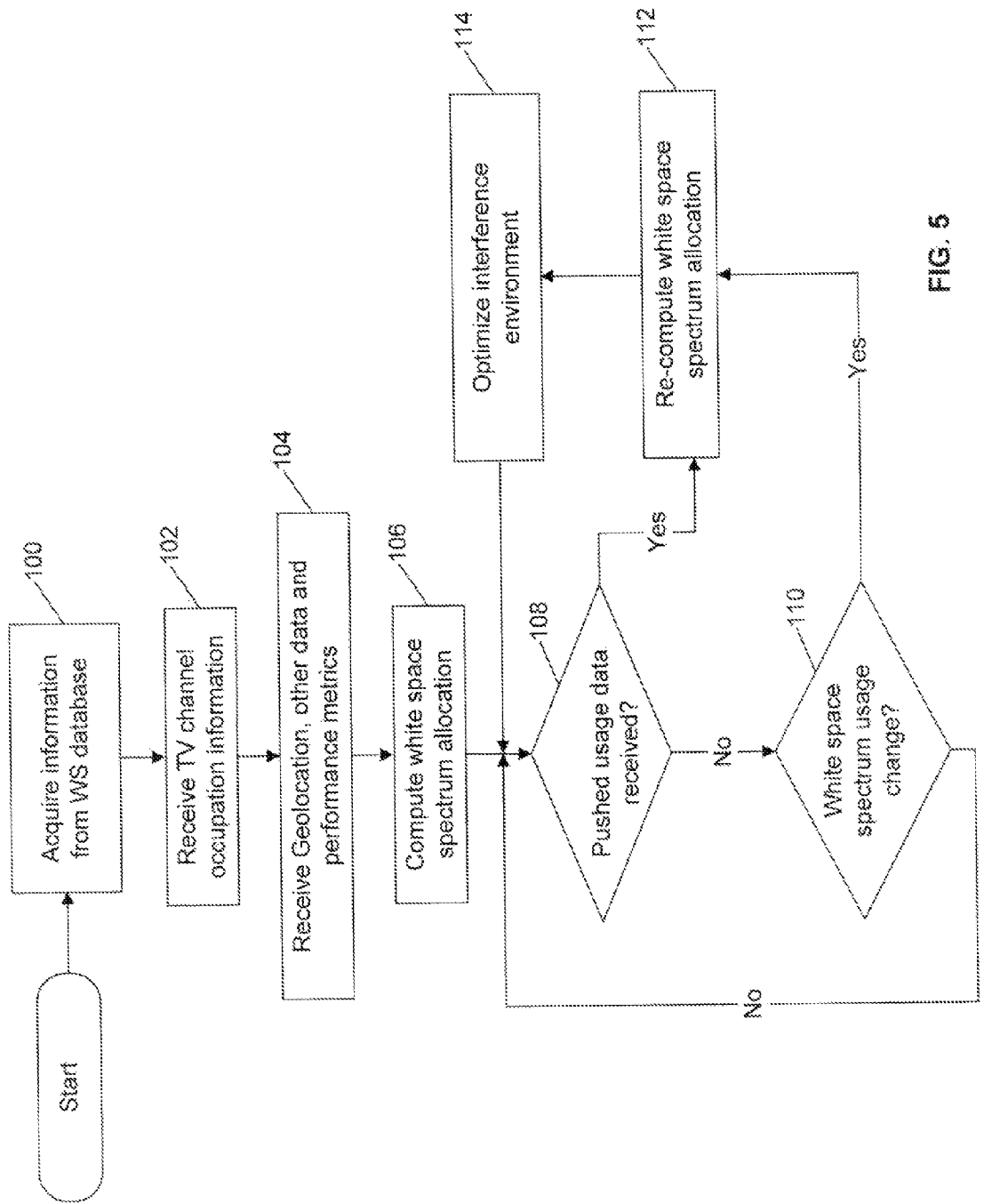
FIG. 5 is a flow diagram illustrating principle actions of the spectrum manager in the peer-to-peer control network in accordance with the invention.

FIG. 5 is a flow chart that provides a high-level overview of the operations performed by the processor 51*a* in conjunction with other software and hardware components of the spectrum manager 50*a*. For simplicity, the operations are explained with reference only to the spectrum manager 50*a*. The spectrum manager 50*a* acquires (100) information about protected TV channels from the WS database 10. As explained above, this information may be pulled by the spectrum manager 50*a* from the WS database 10, or pushed to the spectrum manager 50*a* by the WS database 10. The spectrum manager 50*a* also receives (102) TV channel occupation information from its peer TV band sensing engine 60, which collects, analyzes and distills TV channel sensing information from TV channel sensing sources, including the TV band devices 20. The sensing manager 50*a* also receives (104) geolocation information from its peer geolocation engine 62, which collects, analyzes and distills device location information from geolocation sensing sources, including from global positioning system (GPS) sensors on base stations 82*a*-82*c* and 86*a*-86*d* and TV band devices 20. The sensing manager 50*a* may also receive (104) other data, such as radio configurations of both the TV band devices 20 under its control and those belonging to other service providers, and performance metrics such as location based bit error rate/frame error rate (BER/FER), received signal strength indication (RSSI), carrier to interference ratio (C/I), etc. from the base stations 82*a*-82*c* and 86*a*-86*d* and/or the TV band devices 20

The spectrum manager 50*a* then computes white space spectrum allocations (106) based on the white space spectrum allocation policy 52*a*, taking into account white space reuse schemes, network topology, and other factors, in order to optimize network throughput. As indicated above, the spectrum manager 50*a* serves as an anchor point for broadcasters 14 and regulators 16, enabling those entities to intervene in the management of TV band devices 20 under the control of the spectrum manager 50*a*. If the WS database 10 pushes (108) TV channel usage data to the spectrum manager 50*a*, the spectrum manager 50*a* reacts (actively and proactively) to guarantee that incumbent system broadcasts are protected, while minimizing any interruption of services provided to the TV band devices 20 that are active in the area(s) served. If the peer spectrum manager 50*b* informs (110) the peer spectrum manager 50*a* that one or more of its base station(s) has changed its white space spectrum usage, e.g., the TV channel it is using for service provision, the spectrum manager 50*a* determines (106) whether re-calculation of its white space spectrum allocations is required. As an example, if that TV channel, or a portion of it, is part of the spectrum allocated by the spectrum manager 50*a*, the spectrum manager 50*a* re-computes its white space spectrum allocations (106). As understood by those skilled in the art, any change in white space spectrum allocations may generate a change in the interference environment, so the spectrum manager 50*a* reacts (114) by optimizing the interference environment parameters across all of the TV band devices 20 that it serves, either as a courtesy under the spectrum usage etiquette and/or to re-optimize network data throughput by re-deploying the frequency plan and spectrum sharing plan and guiding the TV band devices 20 to re-associate with their respective BTS/AP 70. Even though a spectrum manager 50*a* that serves only one service provider server cannot change the white space spectrum usage of any other service provider, the spectrum manager 50*a* may consider the white space spectrum usage by the other service providers when allocating white space spectrum to BTS/AP(s) 70 under its control, and may negotiate with another peer spectrum manager operated by the other service provider(s) when white space spectrum sharing is required.

The spectrum manager 50*a* has the flexibility to adapt to different WS database 10 architectures. The spectrum manager 50*a* may have some overlap of functionality with a radio resource management (RRM) entity which may reside on the same BTS/AP 70. For example, in some embodiments, the RRM operates to manage radio resources across a certain part of the TV spectrum; in which case, the spectrum manager 50*a* acquires information from the RRM, and then determines which spectrum piece(s) to use.

Various illustrative implementations of the present invention have been described. However, one of ordinary skill in the art will see that additional implementations are also possible and within the scope of the present invention. Those of skill in the art will appreciate that the various illustrative modules and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in computer or controller accessible on computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

The invention claimed is:

1. A peer-to-peer control network for a wireless radio access network, comprising:
   a peer television (TV) band sensing engine that collects TV band spectrum occupancy information;
   a peer geolocation engine that collects device location information from base stations and TV band devices in the wireless radio access network, regarding locations of the TV band devices; and
   a peer spectrum manager and base station controller having a communications link to a white space database server, and a processor that processes spectrum occupancy information received from the peer TV band sensing engine, the peer geolocation engine, and the white space database server,
   the peer spectrum manager allocating white space spectrum to at least one base station and TV band devices associated with the at least one base station based on white space spectrum available within a given area encompassing the at least one base station and the TV band devices located at a location indicated by the device location information received from the peer geolocation engine, and the available white space spectrum being received from the white space database server.

2. The peer-to-peer control network as claimed in claim 1, wherein the base station is an access point.

3. The peer-to-peer control network as claimed in claim 2, wherein the spectrum manager resides on the access point.

4. The peer-to-peer control network as claimed in claim 3, wherein the spectrum manager is a standalone device that serves a plurality of access points and all TV band devices associated with any of the access points.

5. The peer-to-peer control network as claimed in claim 3, wherein the spectrum manager is functionally distributed among a plurality of access points.

6. The peer-to-peer control network as claimed in claim 1, wherein the base station is a base transceiver station.

7. The peer-to-peer control network as claimed in claim 6, wherein the spectrum manager resides on the base transceiver station.

8. The peer-to-peer control network as claimed in claim 5, wherein the spectrum manager is a standalone device that serves a plurality of base transceiver stations and all TV band devices associated with any of the base transceiver stations.

9. The peer-to-peer control network as claimed in claim 5, wherein the spectrum manager is functionally distributed among a plurality of base transceiver stations.

10. A method of controlling television (TV) band white space spectrum usage by base stations of a remote wireless access network, comprising:

provisioning the remote wireless access network with a peer-to-peer control network that comprises peer spectrum manager and base station controllers respectively having a communications link to a white space database server, and a processor that processes TV band spectrum occupancy information received from peer TV band sensing engines, peer geolocation engines that collect device location information from the base stations and the TV band devices in the wireless radio access network regarding locations of the TV band devices, and the white space database; and allocating TV band white space spectrum to the base stations and TV band devices associated with the base stations based on the TV band white space spectrum available within a oiven area encompassing the base station and the TV band devices located at a location indicated by the device location information received from the peer geolocation engines, and the available TV band white space spectrum is received from the white space database server.

11. The method as claimed in claim 10 wherein the peer spectrum managers are pushed TV band spectrum occupancy information by the white space database, and pushed TV band spectrum usage changes by their peer spectrum managers.

12. The method as claimed in claim 11 wherein the peer spectrum managers respectively determine whether TV band white space spectrum allocations for one or more base stations must be re-computed if the peer spectrum managers are pushed at least one of TV band spectrum occupancy information and TV band spectrum usage changes.

13. The method as claimed in claim 12 wherein the peer spectrum managers respectively optimize interference environment associated with any base stations for which the TV band white space spectrum allocations were re-computed.

14. A spectrum manager and base station controller in a peer-to-peer control network for a television (TV) band white space wireless radio access network, comprising:
 a TV band white space allocation policy;
 a communications link to a white space database server; and
 a processor that processes spectrum occupancy information received from a peer TV band sensing engine, a peer geolocation engine that collects device location information from base stations and TV band devices in the wireless radio access network, regarding the locations of those devices, and the white space database,
 the processor allocates white space spectrum to the base station and the TV band devices associated with the base station based on the TV band white space allocation policy and the white space spectrum available within a given area encompassing th base station aqnd the TV band devices located at the device location information received from the peer geolocation engine, and wherein the white space spectrum is received from the white space database server.

15. The spectrum manager and base station controller as claimed in claim 14 wherein the spectrum manager and base station controller resides on the base station the spectrum manager and base station controller controls.

16. The spectrum manager and base station controller as claimed in claim 14 wherein the spectrum manager and base station controller is a standalone device that serves a plurality of base stations and all TV band devices associated with the respective base stations.

17. The spectrum manager and base station controller as claimed in claim 14 wherein the spectrum manager and base station controller is functionally distributed among a plurality of base stations in the wireless radio access network.

18. The spectrum manager and base station controller as claimed in claim 14 wherein allocation policy adheres to a Federal Communications Commission Ruling and Order respecting TV band white space usage, and the spectrum manager has the authority to shut down TV band devices and to report to higher authorities any problematic TV band device under its control.

19. The spectrum manager and base station controller as claimed in claim 14 wherein the spectrum manager and base station controller has a direct communications link with the TV band sensing engine, the TV band geolocation engine and all other spectrum manager and base station controllers in the wireless radio access network.

20. The spectrum manager and base station controller as claimed in claim 14 wherein the spectrum manager and base station controller optimizes TV band white space spectrum usage when allocating TV band white space spectrum to a base station the spectrum manager and base station controller controls.

* * * * *